(12) United States Patent
Partes et al.

(10) Patent No.: US 9,843,075 B2
(45) Date of Patent: Dec. 12, 2017

(54) INTERNAL ENERGY SUPPLY OF ENERGY STORAGE MODULES FOR AN ENERGY STORAGE DEVICE, AND ENERGY STORAGE DEVICE WITH SUCH AN INTERNAL ENERGY SUPPLY

(71) Applicant: Robert Bosch GmbH, Stuttgart (DE)

(72) Inventors: Hans Partes, Asperg (DE); Matthias Heil, Moeglingen (DE); Rostislav Rogov, Stuttgart (DE); Bernhard Seubert, Korntai-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 323 days.

(21) Appl. No.: 14/767,454

(22) PCT Filed: Dec. 27, 2013

(86) PCT No.: PCT/EP2013/078031
§ 371 (c)(1),
(2) Date: Aug. 12, 2015

(87) PCT Pub. No.: WO2014/127871
PCT Pub. Date: Aug. 28, 2014

(65) Prior Publication Data
US 2015/0380776 A1    Dec. 31, 2015

(30) Foreign Application Priority Data
Feb. 19, 2013  (DE) .................. 10 2013 202 650

(51) Int. Cl.
*H01M 10/42* (2006.01)
*B60L 1/00* (2006.01)
(Continued)

(52) U.S. Cl.
CPC .......... *H01M 10/4257* (2013.01); *B60L 1/00* (2013.01); *B60L 3/0084* (2013.01);
(Continued)

(58) Field of Classification Search
CPC . Y02T 10/7005; Y02T 10/7061; Y02T 10/92; H02M 7/537; H02M 7/5387
See application file for complete search history.

(56) References Cited

U.S. PATENT DOCUMENTS

| | | | |
|---|---|---|---|
| 5,642,275 A | 6/1997 | Peng et al. | |
| 2005/0121979 A1 | 6/2005 | Matsumoto et al. | |
| 2005/0231152 A1 | 10/2005 | Welchko et al. | |

FOREIGN PATENT DOCUMENTS

| | | |
|---|---|---|
| CN | 101091299 A | 12/2007 |
| CN | 102308430 A | 1/2012 |

(Continued)

OTHER PUBLICATIONS

International Search Report for Application No. PCT/EP2013/078031 dated Oct. 2, 2014 (English Translation, 2 pages).

*Primary Examiner* — Robert Deberadinis
(74) *Attorney, Agent, or Firm* — Michael Best & Friedrich LLP

(57) ABSTRACT

The invention relates to an energy storage module for an energy storage device, comprising an energy storage cell module which has a storage cell series circuit of at least two energy storage cells, comprising a coupling device, which comprises a plurality of coupling elements and is designed to selectively connect the energy storage cell module into an energy supply line of the energy storage device or to bypass the energy storage cell module in an energy supply line, and comprising a driver module which is designed to generate drive signals for the plurality of coupling elements. The driver module has a first energy supply connection and a second energy supply connection. The first energy supply connection is connected to a first end connection of the energy storage cell module via a first supply line and to a first node point between two energy storage cells of the storage cell series circuit via a second supply line. The (Continued)

second energy supply connection is connected to a second end connection of the energy storage cell module via a third supply line and to a second node point between two energy storage cells of the storage cell series circuit via a fourth supply line. The second node point lies between the first node point and the first end connection.

9 Claims, 4 Drawing Sheets

(51) Int. Cl.
| | | |
|---|---|---|
| B60L 3/00 | (2006.01) | |
| B60L 11/18 | (2006.01) | |
| H02J 7/00 | (2006.01) | |
| H02M 7/483 | (2007.01) | |
| H02M 7/537 | (2006.01) | |

(52) U.S. Cl.
CPC ....... B60L 11/1853 (2013.01); B60L 11/1864 (2013.01); B60L 11/1866 (2013.01); H02J 7/0024 (2013.01); H02J 7/0029 (2013.01); H02M 7/483 (2013.01); *Y02T 10/7005* (2013.01); *Y02T 10/7061* (2013.01); *Y02T 10/92* (2013.01)

(56) References Cited

FOREIGN PATENT DOCUMENTS

| | | |
|---|---|---|
| DE | 102010027857 | 10/2011 |
| DE | 102010027861 | 10/2011 |
| DE | 102010041040 | 3/2012 |
| EP | 2549634 | 1/2013 |
| JP | H11122952 A | 4/1999 |

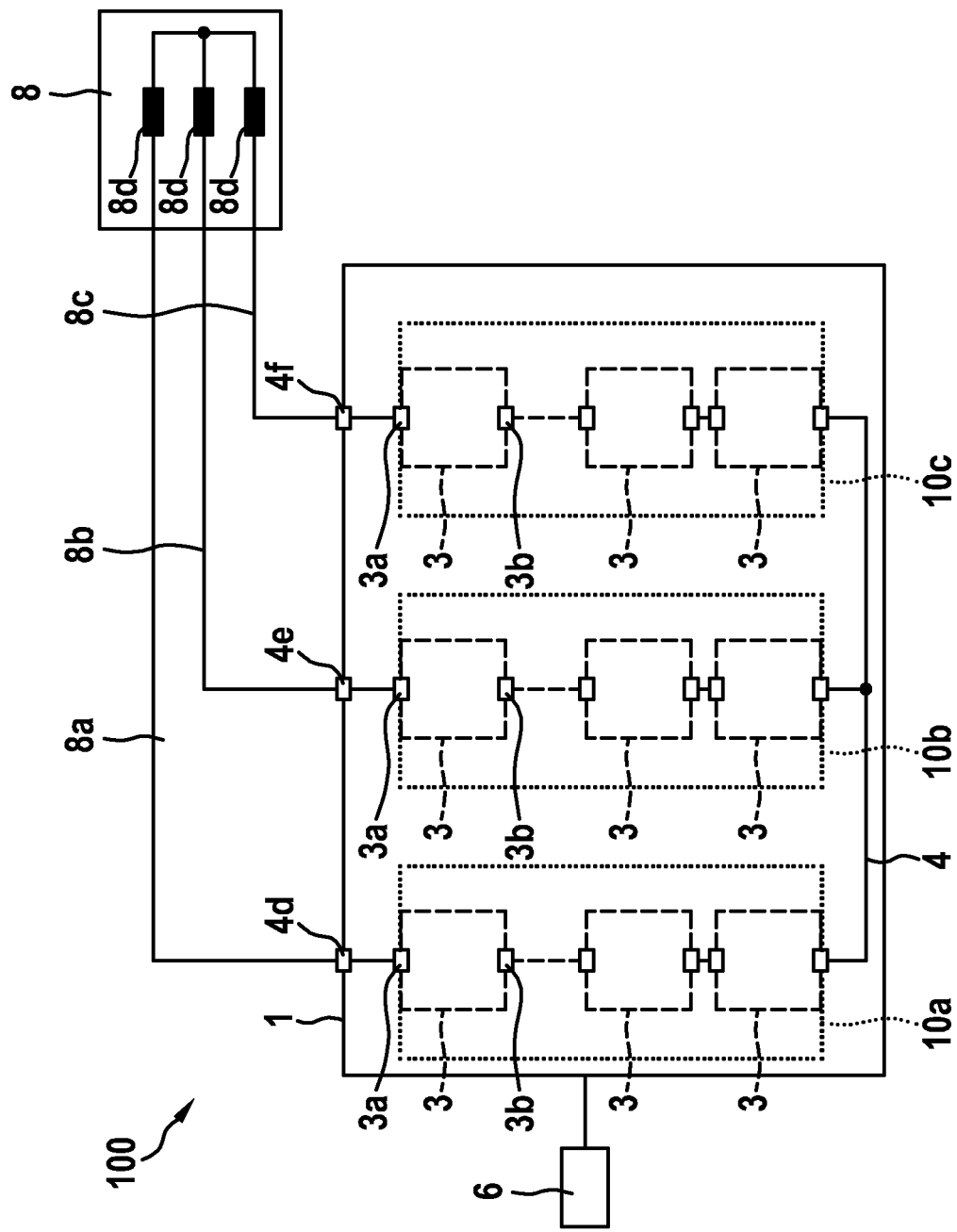

INTERNAL ENERGY SUPPLY OF ENERGY STORAGE MODULES FOR AN ENERGY STORAGE DEVICE, AND ENERGY STORAGE DEVICE WITH SUCH AN INTERNAL ENERGY SUPPLY

BACKGROUND OF THE INVENTION

The invention relates to an internal energy supply for an energy storage module for an energy storage device and an energy storage device comprising such an energy storage module, in particular in modularly constructed battery direct inverter circuits or battery converter circuits which, for example, are used in electrical drive systems of electrically driven vehicles.

It is becoming apparent that electronic systems, which combine new energy storage technologies with electrical drive engineering, will increasingly be used in the future in stationary applications, such as, e.g., wind power turbines or solar plants, as well as in vehicles, such as hybrid or electric vehicles.

In order to feed three-phase alternating current into an electrical machine, a DC voltage provided by a DC intermediate circuit is conventionally converted into a three-phase alternating voltage by means of an inverter in the form of a pulse width modulated inverter. The DC intermediate circuit is fed by a line consisting of serially connected battery modules. In order to meet the requirements for power and energy that are given for a respective application, a plurality of battery modules is frequently connected in series in a traction battery. Such an energy storage system is, for example, frequently used in electrically driven vehicles.

In the American patent publication U.S. Pat. No. 5,642,275 A1, a battery system having an integrated inverter function is described. Systems of this type are known by the name of multilevel, cascaded inverters or also by the name of battery direct inverters (BDI). Such systems comprise direct current sources in a plurality of energy storage module lines which can be directly connected to an electrical machine of an electrical network. Single-phase or multi-phase supply voltages can thereby be generated. The energy storage module lines comprise a plurality of energy storage modules connected in series, wherein each energy storage module has at least one battery cell and an associated controllable coupling unit which allow said module to interrupt the respective energy storage module or bridge the respectively associated at least one battery cell or to connect said respectively associated at least one battery cell into the respective energy storage module line as a function of control signals.

As an alternative, the German patent publications DE 10 2010 027 857 A1 and DE 10 2010 027 861 A1 disclose modularly interconnected battery cells in energy storage devices which can be selectively coupled into or decoupled from the line consisting of battery cells connected in series via a suitable actuation of coupling units. Systems of this type are known by the name of battery direct converter (BDC). Such systems comprise DC supply sources in an energy storage module line, which DC supply sources can be connected by means of a pulse width modulated inverter to a DC intermediate circuit for the electrical energy supply of an electrical machine or an electrical network.

BDCs and BDIs usually have a higher degree of efficiency and a higher degree of reliability with respect to conventional systems. The reliability is ensured inter alia by virtue of the fact that failed battery cells or cells that are not completely efficient can be disconnected by means of a suitable bridging control of the coupling units from the energy supply lines.

The signal and power electronics for the coupling units of the battery cells can be supplied with current from their own battery cells. An interruption in the series circuit of the battery cells during a charging process can however, for example, be a problem here; thus causing the signal and power electronics to no longer be supplied with current, and therefore a shutdown of the coupling units to no longer be assured. An option to remedy this problem consists of a redundant energy supply of the signal and power electronics by means of external energy sources. This, however, requires additional implementation cost and effort for connecting up the redundant energy source.

SUMMARY OF THE INVENTION

According to one embodiment, the present invention provides an energy storage module for an energy storage device, comprising an energy storage cell module which has a storage cell series circuit of at least two energy storage cells, comprising a coupling device, which comprises a plurality of coupling elements and is designed to selectively connect the energy storage cell module into an energy supply line of the energy storage device or to bypass the energy storage cell module in an energy supply line, and comprising a driver module which is designed to generate drive signals for the plurality of coupling elements. The driver module has a first energy supply connection and a second energy supply connection. The first energy supply connection is connected to a first end connection of the energy storage cell module via a first supply line and to a first node point between two energy storage cells of the storage cell series circuit via a second supply line. The second energy supply connection is connected to a second end connection of the energy storage cell module via a third supply line and to a second node point between two energy storage cells of the storage cell series circuit via a fourth supply line. The second node point lies between the first node point and the first end connection.

According to a further embodiment, the present invention provides an energy storage device, comprising at least one energy supply line which is coupled between two output connections of the energy storage device, wherein the energy supply line has a plurality of inventive energy storage modules that are connected in series.

A concept of the present invention is to equip energy storage modules in a series circuit of energy storage modules of an energy storage device comprising modularly structured energy supply lines with a driver module for the coupling elements of the energy storage modules, said driver module being supplied with energy from the respective energy storage module. To this end, two voltage tap points are provided in each case within the series circuit of the energy storage cells of the energy storage module, which respectively feed an energy supply connection of the driver module. These voltage tap points constitute alternative tap points to the tap points at the end connections of the series circuit of the energy storage cells; thus enabling at least a portion of the energy storage cells to still contribute to the energy supply of the driver module in the event of a malfunction within the series circuit.

This advantageously enables safety measures, such as, e.g., a safety shutdown of the energy module, to be performed by the driver module although a malfunction is present in the series circuit of the energy storage cells.

On the other hand, the redundant voltage supply from the energy storage module is itself ensured so that no further external energy supplying components have to be provided, which saves costs, reduces the installation space and increases the efficiency of the energy supply device. In addition, further switching regulators for generating the redundant voltage supply are omitted, whereby manufacturing effort and expenditures and power losses can in turn be avoided.

Secondary advantages achieved by eliminating additional redundant switching regulators include the improved electromagnetic compatibility (EMC), the elimination of further voltage regulators, the elimination of the need for an additional energy source and the elimination of the need to galvanically separate any additional energy source from the energy storage device.

According to one embodiment of the energy storage module according to the invention, the coupling devices can each have a plurality of coupling elements in a full bridge circuit. Alternatively, the coupling devices can each comprise a plurality of coupling elements in a half-bridge circuit.

According to a further embodiment of the energy storage module according to the invention, the energy storage cells can each have lithium-ion accumulators.

According to a further embodiment of the energy storage module according to the invention, the energy storage module can comprise a first diode, which is disposed in the first supply line and the forward direction of which extends from the first end connection to the first energy supply connection.

According to a further embodiment of the energy storage module according to the invention, the energy module can comprise a second diode, which is disposed in the second supply line and the forward direction of which extends from the first node point to the first energy supply connection.

According to a further embodiment of the energy storage module according to the invention, the energy storage module can comprise a third diode, which is disposed in the fourth supply line and the forward direction of which extends from the second energy supply connection to the second node point.

According to a further embodiment of the energy storage module according to the invention, the driver module can comprise a signal control circuit coupled between the energy supply connections and a driver circuit connected in parallel to the signal control circuit, wherein the signal control circuit is designed to actuate the driver circuit for generating driver signals for the plurality of coupling elements.

BRIEF DESCRIPTION OF THE DRAWINGS

Further features and advantages of embodiments of the invention ensue from the following description with reference to the attached drawings.

In the drawings:

FIG. 4 shows a schematic depiction of a further energy storage device according to a further embodiment of the present invention.

DETAILED DESCRIPTION

Figure 1:
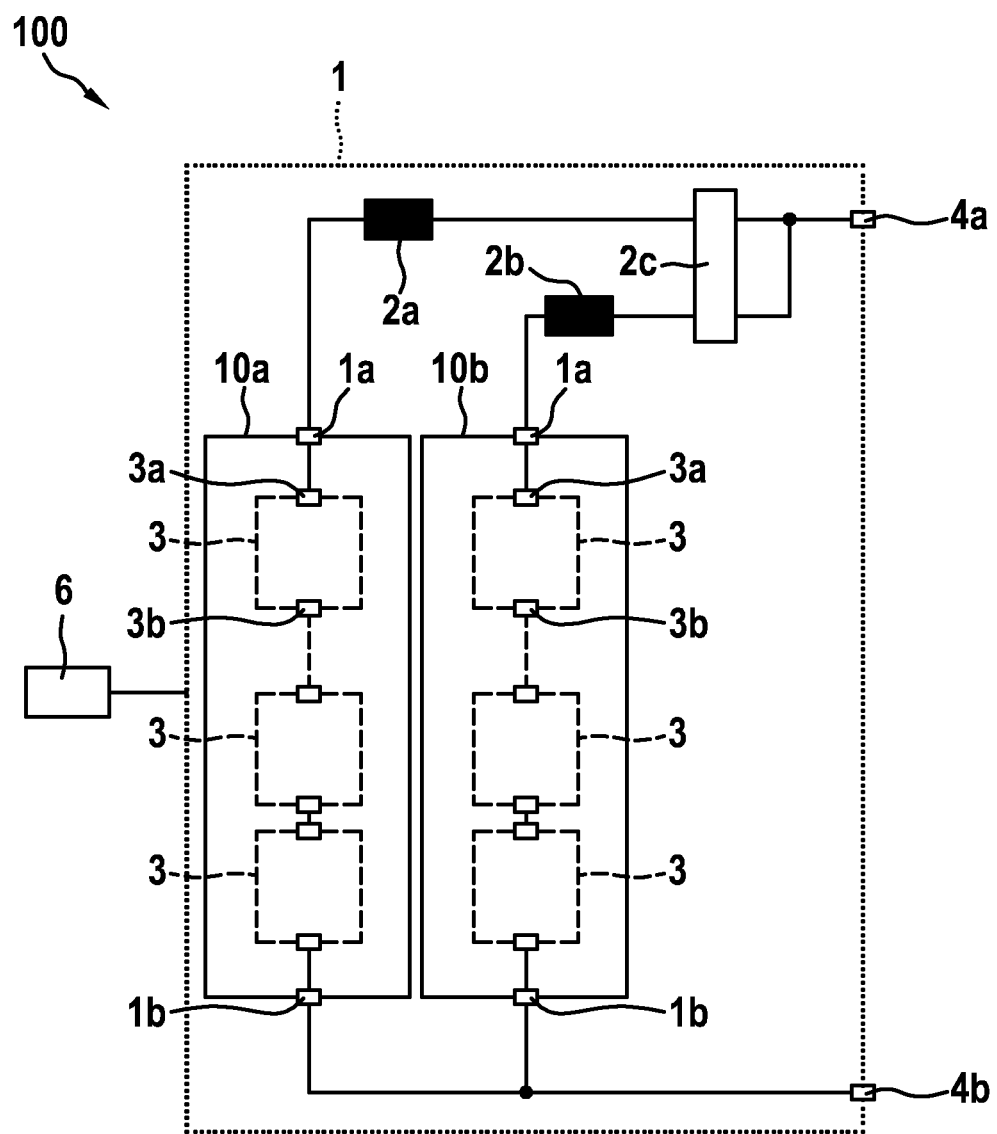
FIG. 1 shows a schematic depiction of an energy storage device according to one embodiment of the present invention.

FIG. 1 shows an energy storage device 1 for providing a supply voltage by means of energy supply lines 10a, 10b, which can be connected in parallel, between two output connections 4a, 4b of the energy supply device 1. The energy supply lines 10a, 10b have respectively line connections 1a and 1b. The energy storage device 1 has in this case two energy supply lines 10a, 10b that are connected in parallel. By way of example, the number of the energy supply lines 10a, 10b in FIG. 1 is two, wherein, however, any other larger number of energy supply lines 10a, 10b is likewise possible. It can also thereby be equally possible to connect only one energy supply line 10a between the line connections 1a and 1b, which in this case form the output connections 4a, 4b of the energy storage device 1.

The energy supply lines 10a, 10b can in each case be coupled to the output connection 4a of the energy supply device 1 via storage inductances 2a, 2b. The storage inductances 2a, 2b can, for example, be concentrated or distributed components. Alternatively, parasitic inductances of the energy supply lines 10a, 10b can also be used as storage inductances 2a, 2b. The energy supply lines 10a, 10b can be switchably coupled to the output connection 4 via a switching/coupling device 2c.

In the case of a single energy supply line 10a, the storage inductances 2a or 2b and the switching/coupling device 2c can also be eliminated; thus enabling the energy supply line to be directly coupled between the output connections 4a, 4b of the energy supply device 1.

Each of the energy supply lines 10a, 10b has at least two energy storage modules 3 connected in series. By way of example, the number of the energy storage modules 3 per energy supply line is two in FIG. 1, wherein, however, any other number of energy storage modules 3 is likewise possible. Each of the energy supply lines 10a, 10b preferably comprises the same number of energy supply modules 3, wherein it is, however, also possible for provision to be made for each energy supply line 10a, 10b to comprise a different number of energy supply modules 3. The energy supply modules 3 have in each case two output connections 3a and 3b, via which an output voltage of the energy storage modules 3 can be provided.

Figure 2:
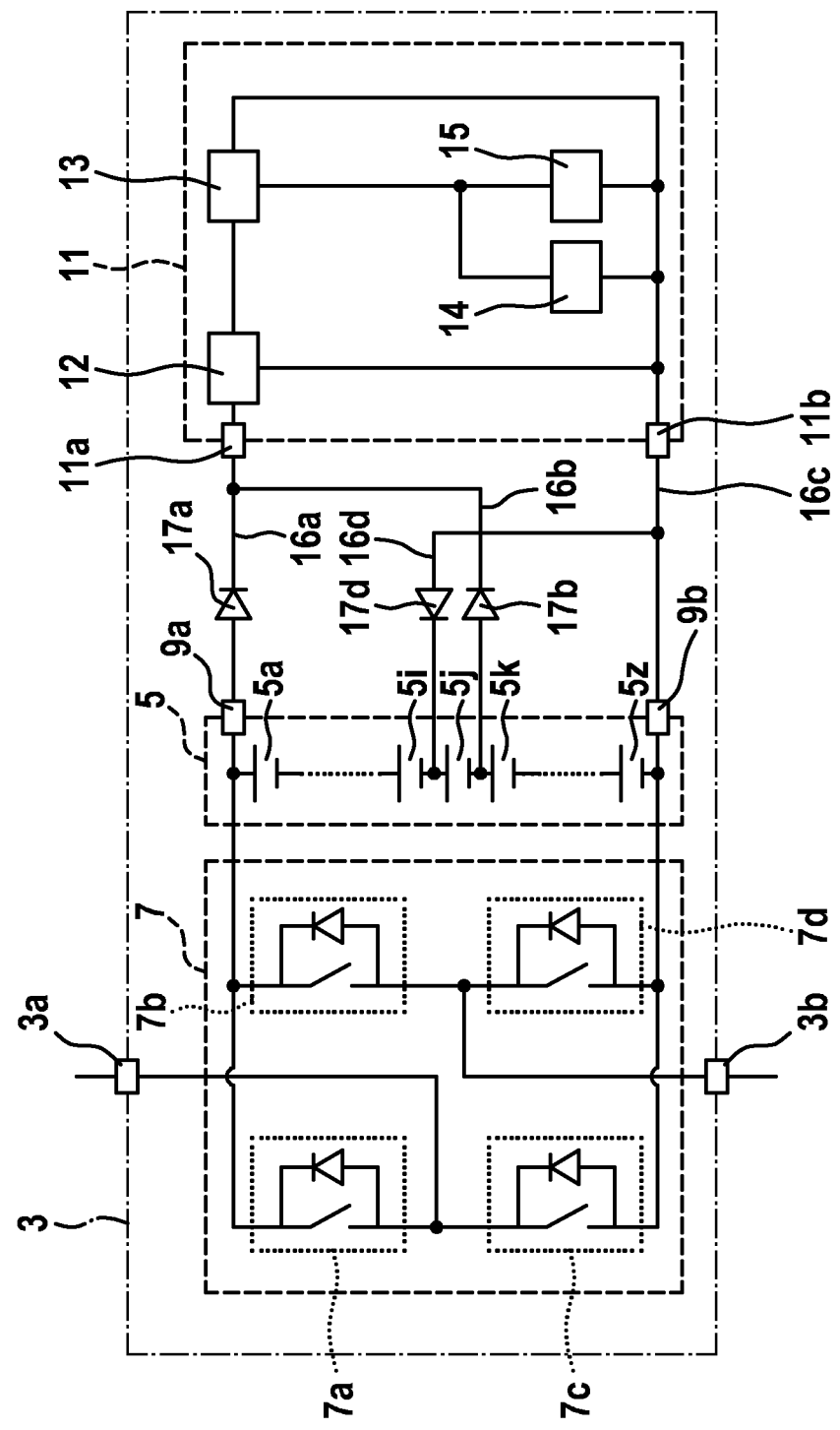
FIG. 2 shows a schematic depiction of an exemplary embodiment of an energy storage module of an energy storage device according to a further embodiment of the invention.
Figure 3:
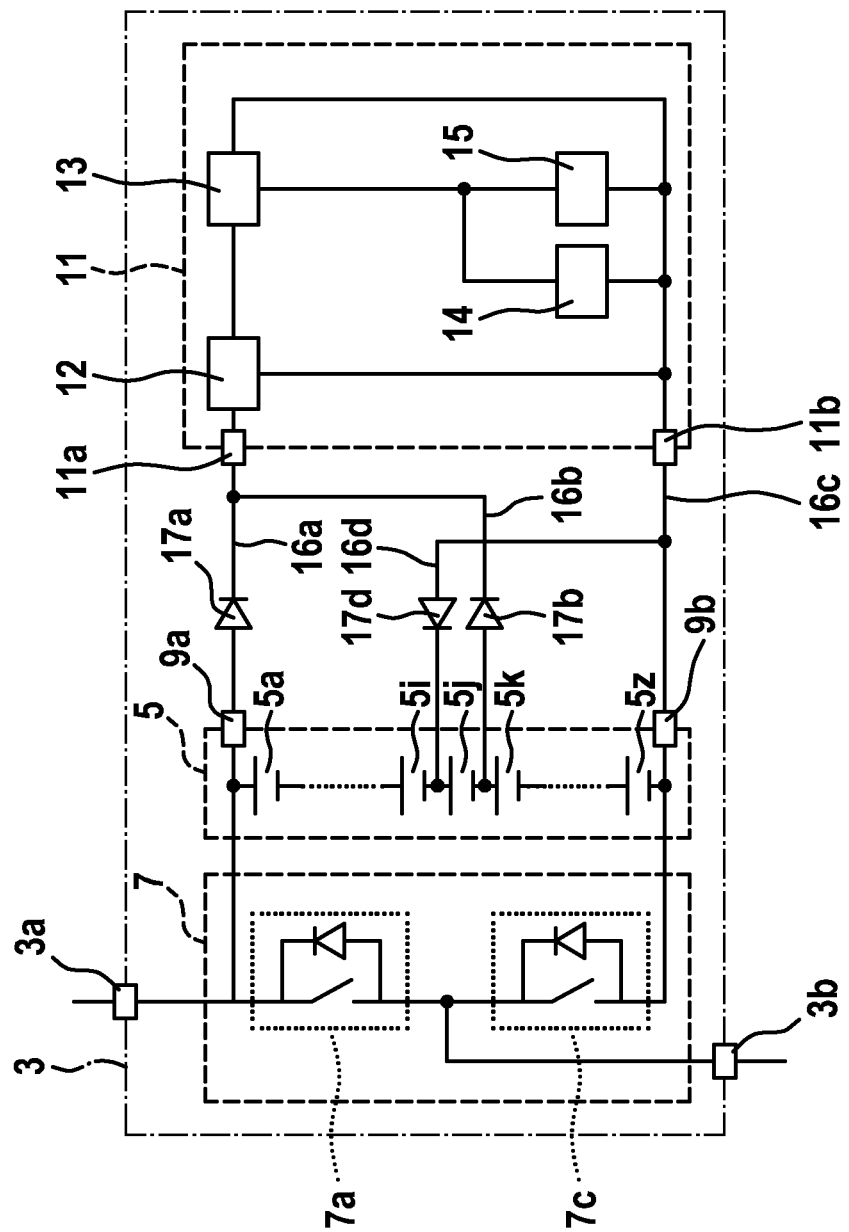
FIG. 3 shows a schematic depiction of a further exemplary embodiment of an energy storage module of an energy storage device according to a further embodiment of the present invention.

Exemplary designs of the energy storage modules 3 are shown in greater detail in FIGS. 2 and 3. The energy storage modules 3 each comprise a coupling device 7 having a plurality of coupling elements 7a and 7c as well as if need be 7b and 7d. The energy storage modules 3 further comprise in each case an energy storage cell module 5 comprising one or a plurality of energy storage cells 5a, 5i, 5j, 5k, 5z connected in series.

The energy storage cell module 5 can, for example, comprise batteries 5a, 5i, 5j, 5k, 5z that are connected in series, for example lithium-ion batteries or accumulators. In this regard, the number of the energy storage cells 5a to 5k in the energy storage module 3 depicted in FIG. 3 amounts, by way of example, to five, wherein any other number of energy storage cells 5a, 5i, 5j, 5k, 5z greater than or equal to two is, however, likewise possible.

The energy storage cell modules 5 are connected to input connections of an associated coupling device 7. The coupling device 7 is designed by way of example in FIG. 2 as a full bridge circuit comprising respectively two coupling elements 7a, 7c and two coupling elements 7b, 7d. The coupling elements 7a, 7b, 7c, 7d can each have an active switching element, for example a semiconductor switch, and a free-wheeling diode connected in parallel thereto. The semiconductor switches can, for example, have field effect transistors (FETs) or insulated-gate bipolar transistors (IGBTs). In this case, the free-wheeling diodes can also in each case be integrated into the semiconductor switches.

The coupling elements 7a, 7b, 7c, 7d in FIG. 2 can be actuated in such a way, for example with the aid of the control device 6 in FIG. 1, that the energy storage cell module 5 is selectively connected between the output connections 3a and 3b or that the energy storage cell module 5 is bridged or bypassed. By means of a suitable actuation of the coupling devices 7, individual energy storage modules 3 can therefore be integrated in a targeted manner into the series circuit of an energy supply line 10a, 10b.

With reference to FIG. 2, the energy storage cell module 5 can, for example, be connected in the forward direction between the output connections 3a and 3b by the active switching element of the coupling element 7d and the active switching element of the coupling element 7a being shifted into a closed state while the two remaining active switching elements of the coupling elements 7b and 7c are shifted into an open state. In this case, a positive module voltage lies between the output terminals 3a and 3b of the coupling device 7. A bridging state can, for example, be adjusted as a result of the two active switching elements of the coupling elements 7a and 7b being shifted into a closed state while the two active switching elements of the coupling elements 7c and 7d are held in the open state. A second bridging state can, for example, be adjusted as a result of the two active switches of the coupling elements 7c and 7d being shifted into a closed state while the active switching elements of the coupling elements 7a and 7b are held in the open state. In both bridging states, the voltage 0 is present between the output terminals 3a and 3b of the coupling device 7. The energy storage cell module 5 can likewise be connected in the reverse direction between the output terminals 3a and 3b of the coupling device 7 by the active switching elements of the coupling elements 7b and 7c being shifted into a closed state while the active switching elements of the coupling elements 7a and 7d are shifted into an open state. In this case, a negative module voltage is applied between the two output terminals 3a and 3b of the coupling device 7.

The total output voltage of an energy supply line 10a, 10b can thereby be adjusted in each case in stages, wherein the number of the stages is scaled to the number of the energy storage modules 3. In relation to a number of n first and second energy storage modules 3, the total output voltage of the energy supply line 10a, 10b can be set in 2n+1 stages.

The coupling elements 7a, 7b, 7c, 7d of an energy storage module 3 can also be actuated in a clocked manner, for example by a method of pulse width modulation (PWM), so that the affected energy storage module 3 delivers a module voltage averaged over time, which can have a value between zero and the maximum possible module voltage determined by the energy storage cells 5a to 5z. The actuation of the coupling elements 7a, 7b, 7c, 7d can, for example, be performed by a control device, such as the control device 6 in FIG. 1, which is designed to carry out, for example, a current control with a subordinated voltage control; thus enabling the individual energy storage modules 3 to be switched on or off in stages.

Besides providing a module output voltage, the energy storage cell module 5 also is used to supply a driver module 11 with energy from the energy storage cells 5a, 5i, 5j, 5k, 5z. To this end, the driver module 11 comprising energy supply connections 11a, 11b is connected in each case to output connections 9a, 9b of the energy storage cell module 5. During normal operation of the energy storage module 5, the module output voltage is applied between the output connection 9a and 9b of the energy storage cell module 5, said module output voltage being emitted to the driver module 11 via a first supply line 16a and a third supply line 16c.

The driver module 11 can, for example, have a pre-stabilizer 12 and a stabilizer 13, which are used to stabilize the supply voltage for the driver module 11. The stabilizer 13 is thereby connected to a parallel circuit consisting of a driver circuit 14 and a signal control circuit 15. The signal control circuit 15 is thereby designed to actuate the driver circuit for generating actuation signals for the coupling elements 7a to 7d of the coupling device 7. The signal control circuit 15 can, for example, comprise a microprocessor, an application specific integrated circuit (ASIC) or a field programmable switch matrix (FPGA) or another logic circuit. The pre-stabilizer 12 and the stabilizer 13 can, for example, comprise filter circuits or transformer circuits which are suited to ensuring a correspondingly adapted supply voltage that is also resistant to fluctuation for the driver circuit 14 and the signal control circuit 15.

In addition to the first supply line 16a, the first energy supply connection of the driver module 11 is connected to a first node point between two energy storage cells 5j and 5k of the series circuit consisting of energy storage cells 5a to 5z via a second supply line 16b. In addition to the third supply line, the second energy supply connection 11b is similarly connected to a second node point between two energy storage cells 5i and 5j of the series circuit consisting of energy storage cells 5a to 5z via a fourth supply line 16d. The second node point lies between the first node point and the first end connection 9a. In other words, the second and fourth supply line 16b or, respectively, 16d serve as redundant supply lines to the first and third supply lines 16a or, respectively, 16c if a malfunction should occur in the series circuit consisting of energy storage cells 5a to 5z, for example if one of the energy storage cells 5a to 5z should fail.

By means of the node points, the series circuit consisting of energy storage cells 5a to 5z is divided in each case into two sections, a lower and an upper section. As a result of the first node point lying between the first end connection 9a and the second node point, the lower and upper sections formed by the (virtual) division have in each case overlapping regions to which respectively the same energy storage cells belong. In the example of FIG. 2, such an overlapping region is formed by the energy storage cell 5j which lies between the first and the second node point. The overlapping region can, of course, also have more than one energy storage cell 5j.

Disjoint groups of energy storage cells lie respectively in the subsections of the upper and lower sections which in each case do not overlap. For example, the upper section has the energy storage cells 5a to 5i, which are different from the energy storage cells 5k to 5z that form the lower section. The number of the energy storage cells in the disjoint groups can likewise lie between one and an arbitrary number of energy storage cells which are adapted to suit the respective requirements.

The supply lines 16a, 16b and 16d each have a diode 17a, 17b or 17d. These diodes ensure that the correct polarity is applied in each case to the energy supply connections 11a, 11b of the driver module 11. To this end, a first diode 17a is disposed in the first supply line 16a; thus enabling the forward direction thereof to extend from the first end connection 9a to the first energy supply connection 11a. A second diode 17b is likewise disposed in the second supply line 16b so that the forward direction thereof extends from the first node point to the first energy supply connection 11a. Finally, the fourth supply line 16d has a third diode 17d, the forward direction of which extends from the second energy supply connection 11b to the second node point.

During normal operation, i.e. without a malfunction or breakdown in the storage cell series circuit, the supply current for the driver module 11 always flows across the first diode 17a. If, however, an interruption of the current path occurs in the upper section of the storage cell series circuit, which upper section is formed by the energy storage cells 5a to 5i, the driver module 11 is supplied with current via the second diode 17b and the second supply line 16b. Conversely, the driver module 11 is supplied with current via a supply current through the third diode 17d and the fourth supply line 16d in the event of an interruption of the current path in the lower section of the storage cell series circuit, said lower section being formed by the energy storage cells 5k to 5z. In the event of an interruption of the current path between the two node points, the driver module 11 is supplied with current by that section of energy storage cells, which has the larger nominal voltage.

In each case, the driver module 11 can always be supplied with current from at least one portion of the energy storage cells 5a to 5z, no matter where in the storage cell series circuit a breakdown occurs. The generation of the supply voltage can thereby be started in a conventional manner via a wake-up mechanism.

FIG. 3 shows a further exemplary embodiment of an energy storage module 3. The energy storage module 3 shown in FIG. 3 differs from the energy storage module 3 shown in FIG. 2 only in that the coupling device 7 has two instead of four coupling elements which are interconnected in a half-bridge circuit instead of in a full bridge circuit.

In the embodiment variants shown, the active switching elements can be embodied as power semiconductor switches, for example in the form of IGBTs (insulated-gate bipolar transistors), JFETs (junction field-effect transistors) or as MOSFETs (metal oxide semiconductor field-effect transistors). The driver circuit 14 can thereby constitute a gate driver circuit for generating gate signals for the power semiconductor switches. As a result of the driver circuit 14 always being supplied with energy from at least one portion of the energy storage cells 5a to 5z, even in the event of a malfunction in the energy storage cell module 5, the switches of a respective half bridge which adjust a bypass state can be opened in the event of a malfunction in order to guide the current past the energy storage cell module 5 and prevent an overloading of the energy storage module 5 or, respectively, of the coupling elements 7a, 7b, 7c, 7d of an energy storage module 3. This can, for example, be performed during a charging operation of the energy storage module 3 in order to eliminate the danger of a fire in the energy storage device 1 in the event that charging current is being inputted into a defective energy storage cell module 5 in an uncontrolled manner.

FIG. 4 shows an electrical drive system 100 comprising a further energy storage device 1 for the voltage conversion of DC voltage provided by energy storage modules 3 into an n-phase AC voltage. The energy storage device 1 comprises energy storage modules 3 which are connected in series in energy supply lines 10a, 10b, 10c. Three energy supply lines 10a, 10b, 10c are shown in FIG. 4 by way of example, which are suited to generating a three-phase alternating voltage, for example for a three-phase machine. It should, however, be understood that any other number of energy supply lines can likewise be possible. The energy supply device 1 has an output connection 4d, 4e, 4f available at each energy supply line.

The energy supply lines 10a, 10b, 10c are respectively connected at the ends thereof to output connections, which in turn can be connected, for example, to a reference potential. The energy storage modules 3 of the energy storage device 1 in FIG. 4 can particularly be designed according to one of the exemplary embodiments of FIGS. 2 and 3, so that the energy supply lines 10a, 10b, 10c can be modularly formed from a series circuit of similar energy storage modules 3. The actuation of the coupling devices 7 can, similarly as in FIG. 1, be performed by a control device 6 of the energy storage device 1.

The energy storage device 1 has an integrated inverter functionality; thus enabling the output connections 4d, 4e and 4f to be directly connected to phase lines 8a, 8b, 8c of the three-phase electrical machine 8. By way of example, the energy storage device in FIG. 4 is used to supply energy to a three-phase electrical machine 8 comprising respective machine chokes 8d which are, for example, connected to one another at a star point. Provision can, however, also be made for the energy storage device 1 to be used for generating electrical current for an energy supply network. The electrical machine can alternatively also be a synchronous or asynchronous machine, reluctance machine or a brushless DC motor (BLDC). It can also be an option to use the energy storage device 1 in stationary systems, for example in power plants, in electrical energy generation plants, such as, e.g., wind power stations, photovoltaic power plants or cogeneration plants; in energy storage systems, such as, e.g. compressed air energy storage stations, battery storage power plants, flywheel storage systems, pumped-storage plants of similar systems. A further application option of the drive system 100 in FIG. 4 includes passenger vehicles or goods transport vehicles which are designed to move on or under water, for example ships, motor boats or the like.

The invention claimed is:

1. An energy storage module for an energy storage device, the energy storage module comprising:
    an energy storage cell module, the energy storage cell module having a storage cell series circuit of at least two energy storage cells;
    a coupling device, the coupling device having a plurality of coupling elements and configured to selectively connect the energy storage cell module into an energy supply line of the energy storage device or to bypass said energy storage cell module in an energy supply line; and
    a driver module configured to generate drive signals for the plurality of coupling elements, wherein the driver module has a first energy supply connection and a second energy supply connection, the first energy supply connection being connected to a first end connection of the energy storage cell module via a first supply line and to a first node point between two energy storage cells of the storage cell series circuit via a second supply line, the second energy supply connection being connected to a second end connection of the energy supply cell module via a third supply line and to a second node point between two energy storage cells of the storage cell series circuit via a fourth supply line, and wherein the second node point lies between the first node point and the first end connection.

2. The energy storage module according to claim 1, wherein the coupling devices each have a plurality of coupling elements in a full bridge circuit.

3. The energy storage module according to claim 1, wherein the coupling devices each have a plurality of coupling elements in a half-bridge circuit.

4. The energy storage module according to claim 1, wherein the energy storage cells each have lithium-ion accumulators.

5. The energy storage module according to claim 1, further comprising:
   a second diode, the second diode disposed in the first supply line and the forward direction of which extends from the first end connection to the first energy supply connection.

6. The energy storage module according to claim 1, further comprising:
   a second diode, the second diode disposed in the second supply line and the forward direction of which extends from the first node point to the first energy supply connection.

7. The energy storage module according to claim 1, further comprising:
   a third diode, the third diode disposed in the fourth supply line and the forward direction of which extends from the second energy supply connection to the second node point.

8. The energy storage module according to claim 1, wherein the driver module has a signal control circuit coupled between the energy supply connections and a driver circuit connected in parallel to the signal control circuit, the signal control circuit configured to actuate the driver circuit for the generation of driver signals for the plurality of coupling elements.

9. The energy storage device, comprising:
   at least one energy supply line coupled between two output connections of the energy storage device, the energy supply line comprising a plurality of energy storage modules according to claim 1 that are connected in series.

* * * * *